US 6,405,206 B1

(12) United States Patent
Kayahara

(10) Patent No.: US 6,405,206 B1
(45) Date of Patent: Jun. 11, 2002

(54) METHOD AND APPARATUS FOR SEARCHING INFORMATION, AND A RECORDING MEDIUM ON WHICH IS RECORDED AN INFORMATION SEARCHING PROGRAM

(75) Inventor: Naoki Kayahara, Suwa (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 09/200,953

(22) Filed: Nov. 30, 1998

(51) Int. Cl.[7] .............................................. G06F 17/30
(52) U.S. Cl. .............................. 707/102; 707/3; 707/4; 707/5; 707/104.1; 707/103 Y; 345/700; 345/968
(58) Field of Search ..................... 707/102, 3, 103 Y, 707/104, 4, 5, 103; 345/700, 968

(56) References Cited

U.S. PATENT DOCUMENTS

| | | | | |
|---|---|---|---|---|
| 5,579,468 A | * | 11/1996 | Miyauchi et al. | 345/326 |
| 6,012,055 A | * | 1/2000 | Campbell et al. | 707/5 |
| 6,028,603 A | * | 2/2000 | Wang et al. | 345/350 |
| 6,029,165 A | * | 2/2000 | Gable | 707/3 |
| 6,101,486 A | * | 8/2000 | Roberts et al. | 705/27 |
| 6,108,686 A | * | 8/2000 | Williams, Jr. | 709/202 |
| 6,144,968 A | * | 11/2000 | Zellweger | 707/104 |

OTHER PUBLICATIONS

Printout of "General Magic" home page, PORTICO™, Jan. 14, 1999 œβ O, Copyright 1997–1998 General Magic, Inc., Sunnyvale, CA 94086 USA, 19 pages.

* cited by examiner

Primary Examiner—John Breene
Assistant Examiner—Debbie M Le
(74) Attorney, Agent, or Firm—Oliff & Berridge, PLC

(57) ABSTRACT

When searching information from the Internet, for example, it is difficult to effectively and accurately obtain the information which the user desires. Moreover, it is also difficult to display the searched information which the user desires. Several types of processing managers (called editors) are described with icons and displayed, respectively, on the display screen of the personal computer or the like, and characteristics that show what kind of searching and editing each editor performs are also displayed. Searching and editing are performed in accordance with the characteristic of an editor selected by the user, and the edited result is displayed.

25 Claims, 2 Drawing Sheets

| EDITOR | OCCUPATION / AGE | CHARACTERISTICS (SEARCH- EDITING METHOD) |
|---|---|---|
| A (a1) | TEACHER 45 YEARS OLD | EDITOR WHO PERFORMS A SEARCH AND DISPLAY THAT CONCENTRATES ON THE MAIN POINT |
| B (a2) | FEMALE OFFICE WORKER 24 YEARS OLD | EDITOR WHO SEARCHES AND DISPLAYS THE INFORMATION WITH LOTS OF IMAGES |
| C (a3) | SCIENTIST 60 YEARS OLD | EDITOR WHO SEARCHES AND DISPLAYS MANY RELATED REFERENCES AND INFORMATION |
| D (a4) | COUNSELOR 55 YEARS OLD | EDITOR WHO UNDERSTANDS YOUR TASTE |

| EDITOR | OCCUPATION / AGE | CHARACTERISTICS (SEARCH· EDITING METHOD) |
|---|---|---|
| A | TEACHER 45 YEARS OLD | EDITOR WHO PERFORMS A SEARCH AND DISPLAY THAT CONCENTRATES ON THE MAIN POINT |
| B | FEMALE OFFICE WORKER 24 YEARS OLD | EDITOR WHO SEARCHES AND DISPLAYS THE INFORMATION WITH LOTS OF IMAGES |
| C | SCIENTIST 60 YEARS OLD | EDITOR WHO SEARCHES AND DISPLAYS MANY RELATED REFERENCES AND INFORMATION |
| D | COUNSELOR 55 YEARS OLD | EDITOR WHO UNDERSTANDS YOUR TASTE |

FIG. 1

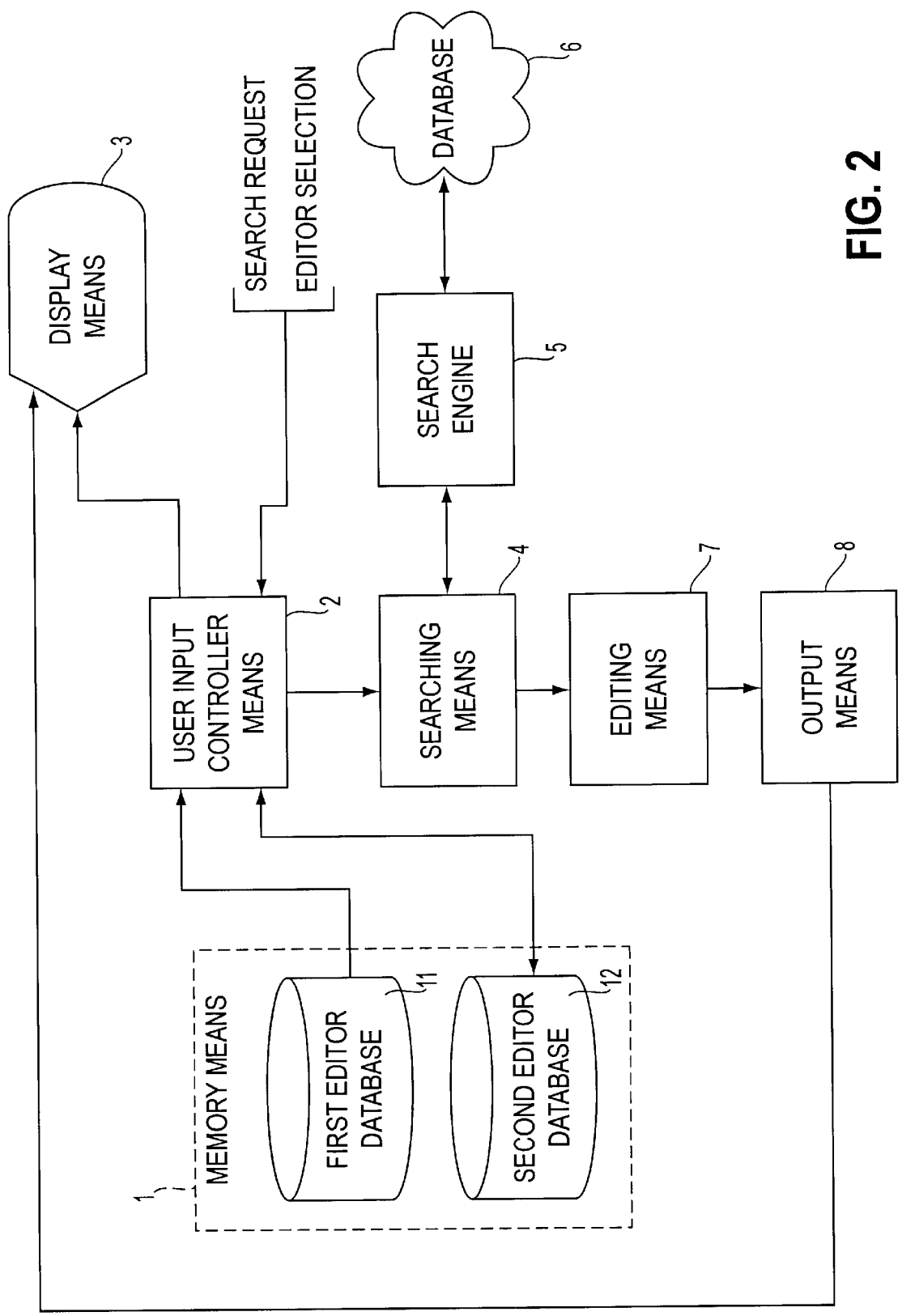

METHOD AND APPARATUS FOR SEARCHING INFORMATION, AND A RECORDING MEDIUM ON WHICH IS RECORDED AN INFORMATION SEARCHING PROGRAM

BACKGROUND OF THE INVENTION

1. Field of Invention

The invention relates to a method and apparatus for searching information desired by a user from a database, and performing editing and display as needed, and to a recording medium on which an information search processing program is recorded.

2. Description of Related Art

Conventionally, when searching any type of information from a database in which a tremendous amount of information is saved, it is common to perform processing, wherein a user inputs a keyword, and information which includes the keyword is extracted.

In this type of searching method, the user thinks about the keyword with respect to the information which is going to be searched, and extracts and outputs the information which includes the keyword with a search engine by inputting the keyword.

However, the above-described conventional information searching method only searches by the keyword that is input, regardless of the size of the database being searched or the type of saved information. Therefore, depending on the condition, the amount of information searched may be tremendously large, or alternatively, there may be no information searched.

These conditions can be changed by the keyword setting. Therefore, it is necessary to choose the input keyword(s) appropriately.

In general, it is necessary for the user to consider what type of keyword should be input. For example, if the user cannot obtain the desired information by inputting a certain keyword, it is necessary to perform trial-and-error type searching, such as by inputting a different keyword and re-searching.

Moreover, in order to narrow down the information searched by a certain degree, a plurality of keywords can be input. However, if the user does not know which word to use for certain, it is difficult to set a plurality of keywords. Moreover, often times the context of the information which is extracted by a plurality of keywords is too narrow d-down, which makes obtaining the desired information difficult.

Accordingly, the conventional information searching method cannot easily extract information which the user desires. In particular, a user who is not accustomed with this type of operation cannot perform it smoothly, since the user is not familiar with the operation of extracting desired information by entering only a keyword.

SUMMARY OF THE INVENTION

Therefore, it is an object of the invention to dramatically decrease the burden of the searching operation which is performed by the user, make information searching possible by a searching method which the user desires, and make it possible to output a search result by categorizing and coordinating into a format the user desires.

In order to achieve these objects, an information search processing method comprises the steps of presetting multiple types of searching strategies which show ways of information searching, displaying the multiple types of searching strategies on a display means in order to allow a user to select an arbitrary searching strategy among the multiple types of searching strategies, and searching information in response to a searching request that is input by the user.

In accordance with another aspect of the method, multiple personified processing managers are prepared to enable the user to select an arbitrary searching strategy among the multiple types of searching strategies, the processing managers being displayed by multiple icons, respectively, each of the multiple types of searching strategies being set corresponding to an individual icon of the multiple icons, and the corresponding searching strategy being selected by selecting one of the multiple icons.

In accordance with another aspect of the method, at least one processing manager of the multiple personified processing managers is a personified processing manager that learns an individual user's taste in information processing based on the user's past operating conditions, and performs searching based on the learned result when the at least one processing manager is selected by a user.

Another aspect of the method includes presetting multiple types of editing strategies that show ways of editing searched information, displaying the multiple types of editing strategies on a display means so that a user can select an arbitrary editing strategy among the multiple types of editing strategies, and performing editing of said searched information with respect to a search result of a search request which is input by the user, in accordance with an editing strategy which is selected by the user.

In accordance with another aspect of the method, multiple personified processing managers are prepared to enable the user to select an arbitrary editing strategy of the multiple types of editing strategies, the processing managers being displayed by icons, respectively, each of the multiple types of editing strategies being set corresponding to an individual icon of the multiple icons, and a corresponding editing strategy being selected by selecting one of the multiple icons.

In accordance with another aspect of the method, at least one processing manager of the multiple personified processing managers is a personified processing manager that learns an individual user's taste in information processing based on the user's past operating conditions, and performs editing processing based on the learned result when the at least one processing manager is selected by the user.

In accordance with another aspect of the method, in addition to said editing strategy, information is also preset for every icon indicating the type of layout the display is to be performed. in when performing the display of the editing result which is edited in accordance with the editing strategy.

Another aspect of the method includes presetting multiple types of searching strategies that show ways of searching, and multiple types of editing strategies that show ways of editing searched information, displaying the multiple types of searching strategies and editing strategies on display means so that a user can select an arbitrary searching strategy and editing strategy among the multiple types of searching strategies and editing strategies, and searching information and editing the searched information in accordance with the searching strategy and editing strategy which were selected by the user in response to the searching request input by the user.

In accordance with another aspect of the method, to enable the user to select an arbitrary searching strategy and editing strategy among the multiple types of searching strategies and the multiple types of editing strategies that show ways of editing searched information, a plurality of personified processing managers are prepared, the processing managers being displayed as multiple icons, the multiple types of searching strategies and the multiple types of editing strategies being set corresponding to respective individual icons of the multiple icons, and a corresponding searching strategy and editing strategy being selected by selecting one of the icons.

In accordance with another aspect of the method, at least one processing manager of the multiple personified processing managers is a personified processing manager that learns an individual user's taste in information processing based on the past operating conditions of the user, and searching and editing processing are performed based on the learned result when the at least one processing manager is selected by the user.

In accordance with another aspect of the method, in addition to said searching strategy and said editing strategy, information is preset for each icon indicating what kind of layout the display is to be performed in when performing a display of the editing result which is edited in accordance with the editing strategy.

An information search processing device in accordance with the invention comprises memory means that stores multiple types of searching strategies that show ways of information searching, user input controlling means that accepts a searching request of a user, reads out the multiple types of searching strategies from said memory means, and displays them on a display means to enable the user to select an arbitrary searching strategy among the multiple types of searching strategies, and searching means that performs information searching with respect to the searching request which was input by the user in accordance with the searching strategy which is selected by the user.

In accordance with another aspect of the device, multiple personified processing managers are prepared to enable the user to select an arbitrary searching strategy among the multiple types of searching strategies, the processing managers being displayed by multiple icons, respectively, each of the multiple types of searching strategies being set corresponding to an individual icon of the multiple icons, and the corresponding searching strategy being selected by selecting one of the icons.

In accordance with another aspect of the device, at least one processing manager of the multiple personified processing managers is a personified processing manager that learns an individual user's taste in information processing based on the user's past operating conditions, and performs editing processing based on the learned result when the at least one processing manager is selected by the user.

Another aspect of the device comprises memory means that stores multiple editing strategies that show ways of editing with respect to searched information, user input controlling means that accepts a searching request of a user, reads out the multiple types of editing strategies that are stored in said memory means, and displays them on a display means so that the user can select an arbitrary editing strategy among the multiple types of editing strategies, and editing strategies that perform editing of searched information in accordance with the editing strategy which is selected by the user.

In accordance with another aspect of the device, a plurality of personified processing managers are prepared to enable the user to select an arbitrary editing strategy among the multiple types of editing strategies, the processing managers being displayed by icons, respectively, each of the multiple types of editing strategies being set corresponding to an individual icon of the multiple icons, and a corresponding editing strategy being selected by selecting one of the icons.

In accordance with another aspect of the device, at least one processing manager among the multiple personified processing managers is a personified processing manager that learns an individual user's taste in information processing based on the user's past operating conditions relating to searching, and performs editing processing based on the learned result when the at least one processing manager is selected by the user.

In accordance with another aspect of the device, in addition to said editing strategy, information is also preset for every icon indicating what kind of layout the display is to be performed in when performing the display of the editing result which is edited in accordance with the editing strategy.

Another aspect of the device comprises memory means that stores multiple types of searching strategies that show ways of searching, and multiple types of editing strategies that show ways of editing searched information, user input controlling means that accepts a searching request of a user, reads out the multiple types of searching strategies and editing strategies that are stored in said memory means, and displays them on a display means so that the user can select an arbitrary searching strategy and editing strategy among the multiple types of searching strategies and editing strategies, searching means that searches information with respect to the searching request of the user in accordance with the searching strategy and editing strategy that are selected by the user, and editing strategies that perform editing with respect to the result that is searched by the searching means, in accordance with the searching strategy and the editing strategy that are selected by said user.

In accordance with another aspect of the device, to enable the user to select an arbitrary searching and editing strategy among the multiple types of searching strategies and the multiple types of editing strategies, multiple personified processing managers are prepared, the processing managers being displayed as icons, respectively, the multiple types of searching strategies and editing strategies being set corresponding to individual icons of the multiple icons and a corresponding searching strategy and editing strategy being selected by selecting one of the icons.

In accordance with another aspect of the device, at least one processing manager among the multiple personified processing managers is a personified processing manager that learns an individual user's taste in information processing based on the past operating conditions of the user, and searching and editing processing are performed based on the learned result when the at least one processing manager is selected by the user.

In accordance with another aspect of the device, in addition to said searching strategy and said editing strategy, information is preset for each icon indicating what kind of layout the display is to be performed in when performing a display of the editing result which is edited in accordance with the editing strategy.

The invention also includes a recording medium on which is recorded an information search processing program, the processing program comprising the steps of storing multiple types of searching strategies that show ways of searching in a memory means, displaying the multiple types of searching strategies on a display means so that a user can select an arbitrary searching strategy among the multiple types of searching strategies that are stored in said memory means, and searching information with respect to the searching request of the user in accordance with the searching strategy that is selected by the user.

In accordance with another aspect of the recording medium, multiple personified processing managers are prepared to enable the user to select an arbitrary searching strategy among the multiple types of searching strategies, the processing managers being displayed by icons, respectively, each of the multiple types of searching strategies being set corresponding to an individual icon of the multiple icons, and the corresponding searching strategy being selected by selecting one of the icons.

In accordance with another aspect of the recording medium, at least one processing manager among the multiple personified processing managers is a personified processing manager that learns an individual user's taste in information processing based on the user's past operating conditions, and performs searching based on the learned result when the at least one processing manager is selected by a user.

The invention also includes a recording medium on which is recorded an information search processing program, the processing program comprising the steps storing multiple types of editing strategies that show ways of editing searched information in a memory means, displaying the multiple types of editing strategies on a display means to enable a user to select an arbitrary editing strategy among the multiple types of editing strategies that are stored in said memory means, and editing the searched information in accordance with the editing strategy which is selected by the user.

In accordance with another aspect of the recording medium, multiple personified processing managers are prepared to enable the user to select an arbitrary editing strategy among the multiple types of editing strategies, the processing managers being displayed by icons, respectively, each of the multiple types of editing strategies being set corresponding to an individual icon of the multiple icons, and a corresponding editing strategy being selected by selecting one of the icons.

In accordance with another aspect of the recording medium, at least one processing manager among the multiple processing managers is a personified processing manager that learns an individual user's taste in information processing based on the user's past operating conditions, and performs editing processing based on the learned result when the at least one processing manager is selected by the user.

In accordance with another aspect of the recording medium, in addition to said editing strategies, information is also preset for every icon indicating what kind of layout the display is to be performed in when performing the display of the editing result which is edited in accordance with the editing strategy.

The invention also includes a recording medium on which is recorded an information search processing program, the processing program comprising the steps of storing multiple types of search strategies that show ways of searching and multiple types of editing strategies that show ways of editing searched information in a memory means, displaying the multiple types of searching strategies and editing strategies on a display means to enable the user to select an arbitrary searching strategy and editing strategy among said multiple types of searching strategies and editing strategies that are stored in said memory means, searching information with respect to the search request of the user in accordance with the searching strategy and editing strategy that are selected by the user, and editing the searched information in accordance with the searching strategy and editing strategy that are selected by the user.

In accordance with another aspect of the recording medium, to enable the user to select an arbitrary searching strategy and editing strategy among the multiple types of searching strategies and editing strategies, multiple personified processing managers are prepared, the processing managers being displayed as icons, the multiple types of searching strategies and the multiple types of editing strategies being set corresponding to respective individual icons of the multiple icons, and a corresponding searching strategy and editing strategy being selected by selecting one of these icons.

In accordance with another aspect of the recording medium, at least one processing manager among the multiple personified processing managers is a personified processing manager that learns an individual user's taste in information processing based on the past operating conditions of the user, and searching and editing processing are performed based on the learned result when the at least one processing manager is selected by the user.

In accordance with another aspect of the recording medium, in addition to said searching strategy and said editing strategy, information is preset for each icon indicating what kind of layout the display is to be performed in when performing a display of the editing result which is edited in accordance with the editing strategy.

Accordingly, the invention performs information searching with respect to a searching request which is input by the user, in accordance with the searching strategy selected by the user by selecting one searching strategy among several types of searching strategies that are displayed on a display screen. Therefore, the information searching which the user desires is performed by merely selecting the searching strategy from on the screen. Because of this, the burden necessary for the searching operation of the user can be dramatically decreased.

Then, the result which is searched by the searching strategy which the user has thus selected is edited according to the user's own system, and it is possible to display the edited result on a display screen after arranging it in a specified layout. Further, it is possible to use this method in other systems by storing it on a recording medium such as a CD ROM (Compact Disk Read Only Memory).

Moreover, since icons that show multiple personified processing managers are prepared, the multiple types of searching strategies can be correlated to respective icons, and by selecting one of these icons, the corresponding searching strategy can be selected. Therefore, when the user selects one of the multiple searching strategies, the user only needs to select one of the icons which shows the personified processing managers, and thus the user can perform the operation while feeling familiar to the operation, even in an information searching operation to which the user is not accustomed.

Moreover, at least one processing manager among the multiple personified processing managers is a processing manager that learns the user's taste in information processing based on the past operating conditions of the user. Therefore, after sufficient learning has occurred, information searching of the user's favorite searching strategy can be performed by just selecting the processing manager. Because of this, the information searching can be easier.

Moreover, the invention performs editing (for example, choosing and discarding information and categorizing the information) of the searched result in accordance with the editing strategy selected by the user by selecting one of editing strategies among multiple types of editing strategies that are displayed on the display screen. Therefore, when editing searched information, the user only needs to select what kind of editing strategy is to be performed from the screen, and editing is performed according to the editing strategy.

Because of this, even when a large amount of information is searched by a keyword input, the editing processing of discarding, selecting and categorizing, can be automatically performed merely by the operation of choosing from the screen, and the burden of the user for editing processing can be largely decreased. Moreover, this can be adapted to any system which uses a searching means.

Moreover, since icons are prepared which show a plurality of personified processing managers, the multiple types of editing strategies correspond to respective icons, and the corresponding editing strategy can be selected by selecting one of these icons. Therefore, when the user selects one of the multiple editing strategies, the editing processing which the user desires can be performed by merely performing the operation of selecting an icon which shows a personified processing manager.

Moreover, among the multiple personified processing managers, at least one processing manager learns the operation tendency of the aforementioned user based on the past operating conditions of the user, and understands the taste of each user. Therefore, after sufficient learning has occurred, the editing of the information by the editing strategy which the user prefers can be performed by merely selecting the processing manager.

Moreover, what kind of layout the edited result will be displayed in is correlated to each processing manager. Therefore, the setting of the layout which the user likes becomes possible by merely selecting the processing manager, and when displayed on the display, a display can be performed with a layout which is easy for the user to view.

Moreover, in the invention, the user selects a searching strategy and an editing strategy, among multiple types of searching strategies and editing strategies that are displayed on the display screen, and information searching is thereby performed, with respect to the search request which the user inputs, in accordance with the selected searching strategy and editing strategy. Additionally, editing of the information which is searched is performed. Therefore, the user only needs to select, from the screen, what kind of searching method will be used in searching the information, and what kind of editing method will be used in editing the searched information. By so doing, searching processing and editing processing are possible according to the selected searching strategy and editing strategy.

Moreover, icons that show multiple personified processing managers are prepared, the multiple types of searching strategies and editing strategies correspond to respective icons, and a corresponding searching strategy and editing strategy can be selected by selecting one of these icons. Therefore, when the user selects one of the multiple searching and editing strategies, the user only needs to perform the operation of selecting the icon which shows a personified processing manager, the user can perform a complicated operation to which the user is not accustomed, such as information searching and editing of the searched information, with a feeling of familiarity.

Moreover, among the multiple personified processing managers, at least one processing manager learns the user's taste in information processing based on the past operating conditions of the user, and after sufficient learning has occurred, information searching and editing of the user's favorite searching style can be performed by just selecting the processing manager. By doing this, the troublesome processing of the information searching and editing can be performed more easily.

Moreover, with respect to the edited result, each processing manager is correlated with a certain kind of display layout. Therefore, the setting of the layout which the user likes can be possible by just selecting the processing manager, and a display with a layout which the user can easily view can be performed.

As explained above, according to the invention, when performing some kind of search, the user merely inputs a keyword as the search request information, views the personified editor list which is displayed on the display screen, and selects an editor that will do searching, editing and layout that are appropriate to the search request information, and the searching and editing are performed by the searching/editing strategy which the user desires, and then displayed in the appropriate layout. Therefore, the burden of the searching operation to the user can be dramatically decreased. In particular, the searching operation is extremely simple even to the user who is not used to this type of operation. For example, the user can have a familiar feeling when performing the operation of receiving some type of information from the Internet which the normal user is not used to.

Moreover, a personified editor is provided that learns the user's taste in information processing by the individual user performing the operations relating to searching many times, and performs the learned result. Therefore, after a certain mount of learning is completed, if the user selects the editor, searching/editing processing which understands the taste of the user is performed, a display with an appropriate layout is performed, and the searching operation can be simplified.

Moreover, the result which is searched by the searching strategy in which the user selected can be edited by the user's own system and the edited result can be displayed on the display in a specified layout. Other than this, for example, it is also possible to edit and display by other systems by storing the search result on a recording medium such as a CD-ROM.

Moreover, it is acceptable to use a searching means which performs existing searching that performs normal searching based on a keyword which is input by the user, and it is also acceptable to perform editing of information which is searched by a normal search, by an editing strategy which is unique to an editor that is selected by the user and to display it in a layout which is unique to the editor. Accordingly, the invention can be adapted to an information searching device which uses an existing searching means.

BRIEF DESCRIPTION OF THE DRAWINGS

FIG. 1 shows one display example of the characteristics of multiple personified editors that have different characteristics, respectively, and their profiles and processing characteristics, in accordance with the invention.

FIG. 2 is a block diagram which explains the embodiment of the information search processing device of the invention.

DETAILED DESCRIPTION OF PREFERRED EMBODIMENTS

An embodiment of the invention displays several different types of personified processing managers as respective icons on the display screen of a personal computer (hereafter PC) or the like, and also displays characteristics showing what type of searching and editing the processing managers perform (the content of showing how to search, and how to edit and display the searched information, hereafter called searching and editing strategy). By allowing the user to select the processing manager (hereafter, editor), searching and editing is performed in accordance with the characteristics of the selected editors, and further, the edited result is displayed.

In detail, as shown in FIG. 1, editors A, B, C and D are displayed and occupations, ages and characteristics (searching and editing strategies) are displayed as the profiles of editors A, B, C and D. In the example of FIG. 1, the portraits of the editors A, B, C and D are displayed by icons A1, A2, A3 and A4 For example, the occupation of editor A is "teacher", and his age is "45 years old"; the occupation of editor B is "OL (female office worker)", and her age is "24 years old"; the occupation f editor C is "scientist", and his age is "60 years old"; and the occupation of editor D is "counselor", and his age is "55 years old".

Then, as the respective characteristics, searching and editing methods are set for each of the three editors A, B, and C such that respective searching of information is performed in accordance with each editor's own searching strategy, and, after editing is performed, respectively, by each editor's own editing strategy with respect to the searched result, a display is performed according to each editor's own layout.

As the specific characteristics (searching/editing strategy) that are shown to the user, for example, as shown in FIG. 1, each searching/editing strategy is simply shown so that the user can tell at a glance what kind of processing each editor performs. For example, the editor A is "an editor that performs a search and display which concentrates on the main point", the editor B is "an editor that searches and displays the information with lots of images ", the editor C is "an editor that searches and displays many related references and information".

Moreover, in the present embodiment, the editor D is an editor that has a different function than the editors A–C. Next, the function of the editor D is explained.

The editor D understands the taste of the user, and it learns what kind of taste the user has for information processing (here, processing relating to the searching, editing and displaying of information) from the user's operating condition by repeated performances of the information searching operation by the user. For example, if the user performs many searching request operations of information concerning automobiles, it learns that the user shows an interest towards automobiles.

Furthermore, if the user selects the editor A many times among the above mentioned editors A–C, it learns that the user favors the searching/editing strategy of the editor A.

Thus, it accumulates the operating condition relating to the search requests of the user, and learns what kind of searching information the user usually performs and what kind of searching/editing strategy the user favors based on history. Accordingly, the characteristic (searching/editing strategy) of the editor D which is shown to the user, as shown in FIG. 1, for example, becomes "an editor who understands your tastes".

Moreover, the photograph of a person's face for each editor A-D can be a photograph of anybody, but it is preferable to use a picture of a person's face which is appropriate to the occupation and age. Moreover, the occupation and age are not particularly limited. In other words, the type of occupation which the user can easily understand and the general age appropriate to that occupation should be chosen. Moreover, there does not need to be a connection between the occupation and the searching/editing method, but it is fine to have such a connection.

FIG. 2 is a block diagram which shows an embodiment of the information search processing device of the invention. In FIG. 2, the memory means 1 comprises a first editor database 11 and a second editor database 12. In the first editor database 11, the information of the editors A–C are stored, when considering the example of the aforementioned FIG. 1. For example, the data of the occupation/age, characteristic (searching/editing strategy) or the like are stored in addition to the data of the face image of the editor A, and the respective data of the face image, occupation/age, characteristic (searching/editing strategy) or the like are also stored, respectively, for the editor B and the editor C. The data are shown in FIG. 1 as one example, and are preset.

Meanwhile, in the second editor database 12, the information about the editor D is stored, when considering the example of the aforementioned FIG. 1. For the editor D, the data of the face image, occupation/age, characteristic (searching/editing method) or the like are stored. Moreover, in this case, since the purpose of the editor D is to understand the taste of the user, it learns the taste of the user based on the search requests of the user, the selection history of the editor or the like, and performs the processing of searching/editing method in accordance with the learned result.

The user input controlling means accepts search request information (keywords or the like) which the user inputs, understands its content, and performs various processing as shown below.

First of all, when the user inputs the search request information, data is read out from the first editor database 11 and the second editor database 12 and displayed on the display screen of the display means 3.

The display content at this time, for example, is shown in FIG. 1. When the user looks at this and selects one of the editors, the information of the selection of that editor and the search request information which was previously input are saved in the second editor database 12, and are reflected upon the search request information and the editor selection information that have previously been saved.

Then, the user input controlling means 2 reads out the characteristics (searching/editing strategy) of the selected editor from the first editor database 11, and passes the searching/editing strategy and the search request information, which was input by the user, to the searching means 4.

The searching means 4 drives the search engine 5 and performs data searching from the database 6 in accordance with the searching strategy which is set for the selected editor based on the search request information and the characteristics (searching/editing strategy) of the selected editor which were passed from the user input controlling means 2.

In other words, various parameters for searching are set based on the information (here, the searching strategy of a certain editor) concerning the searching/editing strategy which was passed from the user input controlling means 2, and the search engine 5 is driven according to the set parameters. In the search engine 5, searching is performed based on the set parameters.

Moreover, the searching strategy is the independent searching strategy of the editor that is selected by the user, and the searching strategy is preset for each editor. For example, a language processing parameter such as a thesaurus and a searching parameter are set for each editor. By doing this, even when using the same search request information (keyword), the way of searching differs depending on the editor. For example, the editor B collects information which contains a lot of images, and the editor C collects a lot of related information. Each editor performs its own searching strategy.

Then, the search result which is searched by the searching means 4 and searching/editing strategy of the selected editor are passed to the editing means 7.

The editing means 7 performs the coordination of the content of the search result which is searched by the searching means 4. First of all, discarding, selecting, and categorizing is performed with respect to the tremendous amount of search results which are in small pieces and which were passed from the searching means 4, based on the searching/editing strategy of the selected editor (here, the editing strategy of a certain editor), and editing is also performed in accordance with the selected editing strategy. Then the edited results and the searching/editing strategy of the selected editor are passed to the output means 8.

The output means 8 sets a layout which is based on the searching/editing strategy of the selected editor with respect to the edited result which is passed from the editing means 7, and outputs the edited result to the display means 3. For example, if it is editor A, which "performs and displays" a "search which concentrates on the main points", processing is performed in which the search result for which keep/discard selection and categorization has been performed by the editing means 7 is laid out as an itemization for each item. Then, the layout result is displayed on the display screen of the display means 3.

The processing steps of the invention are explained above. A more detailed explanation is given below. The user inputs the keywords "newest model automobile" as, for example, search request information. When the user input controlling means 2 receives this search request information, first of all, it reads out the data from the first editor database 11 and the second editor database 12, and displays the content which is shown in FIG. 1 on the display screen of the display means 3.

When the user looks at this, and selects, for example, the icon A2 of the editor B, then clicks this icon, processing is performed in accordance with the characteristics (searching/editing strategy) which are set for the editor B. Moreover, the search request information of "newest model automobile" by this user, the characteristic (searching/editing strategy) of the editor B which is selected from the display screen, or the like are reflected in the content of the second editor database 12.

Since the characteristic (searching/editing strategy) of this editor B, as shown in FIG. 1, is "an editor which searches and displays information which contains lots of images," the user input controlling means 2 passes "newest model automobile", which is the search request information input by the user, and the characteristic of the editor B that is selected to the searching means 4. When the searching means 4 receives this information, it performs searching of the information from the database 6 based on the search request information and the searching/editing strategy (here, the search strategy which is set for the editor B). In this case, since the search request information of the user is "newest model automobile", it uses this as a keyword, and searches information which suits the keyword by driving the search engine 5 based on the searching strategy which is set for the editor B, and passes the search result and the searching/editing strategy of the editor B which is selected by the user to the editing means 7.

In the editing means 7, editing is performed to the search result which was searched by the searching means 4 by performing keep/discard selection of the content and categorizing in accordance with the searching/editing strategy (here, the editing strategy which is set for the editor B) which is set by the editor B, and passes the edited result to the output means 8.

The output means 8 outputs the edited result which is edited by the editing means 7 after placing it in a specified layout in accordance with the searching/editing strategy (here, the layout information which is set for the editor B), which is set for the editor B. The output result is displayed on the display screen of the display means 3.

Thus, the user views a list of the editors that are displayed on the display screen and their characteristics (searching/editing strategy) and selects the appropriate editor depending on the output condition the user desires for the information the user is going to search. By doing this, the searching is performed with the searching strategy which is set for the editor, and editing is also performed which is set for the editor. Furthermore, the display with the appropriate corresponding layout is performed. By doing this, the information can be obtained in the condition which the user desires.

Accordingly, when searching desired information from a database which contains a tremendous amount of data, the searching operation is simple compared to the searching which is performed conventionally by only using a keyword. Thus, the information which the user desires can be extracted effectively and accurately.

Moreover, by repeating this kind of searching operation many times, the search request information that the user inputs and the information which editor selects are saved in the second editor database 12 each time. Then, the aforementioned user's taste in information processing (what kind of search request is made and what kind of editor is selected or the like) is learned, and the learned result is grasped by the editor D in the present embodiment.

Thus, when the learning of the operation tendency of the aforementioned user is sufficiently performed, for example, when the user performs some kind of search, searching by the searching strategy which the user favors is performed merely by inputting a keyword as the search request and selecting the editor D, and editing is performed to the search result with the editing strategy which the user favors. Furthermore, a display is performed in an appropriate layout.

Moreover, the invention is not limited to the above described embodiment, and other embodiments may be employed within the scope of the invention. For example, in the information search processing device of the embodiment of the invention which is shown in FIG. 2, the searching means 4 can perform an existing search. In other words, in the above-mentioned embodiment, the searching means 4 searches in accordance with the searching strategy which is set for each editor. However, it is also acceptable for the searching means 4 to perform an existing search which performs normal searching based on a keyword which is input by the user.

It is also acceptable for editing to be performed by the editing means 7 on information which is searched by normal searching according to a unique editing method set for the editor which is selected by the user to display in a layout is unique to the editor. Accordingly, the invention can be adapted to an information searching device which uses existing searching means and, as in the above-mentioned embodiment, the searching operation itself of the user can be realized by the simple operations of inputting the search request and choosing the favorite editor.

Moreover, in the information search processing device of the present embodiment of the invention which is shown in FIG. 2, as explained in the above embodiment, the search result which is searched by the searching means 4 according to a unique searching strategy set for the editor that is selected by the user can be stored on a storage means such as a CD-ROM or the like and used without performing the processing of passing the search result to the editing means 7 and editing. In this case, the editing means 7 and output means 8 can be included, but it is also possible to simply use the function of the searching device without installing the editing means 7 and output means 8.

Accordingly, the searching operation itself of the user can be realized with the simple operations of inputting the search request information and choosing the favorite editor, as in the above-mentioned embodiment, and the search result can be stored in a memory means such as CD-ROM. Therefore, it is possible to perform an editing operation of the content of CD-ROM by using the editing strategies of other systems.

Moreover, in the above mentioned embodiment, the editor list which is shown in FIG. 1 is displayed on the display screen of the display means 3 by the user's act of inputting search request information to the user input controlling means 2. However, it is possible to use a process in which the editor list is displayed on the display from the beginning in the information searching mode, and the user inputs the search request information and chooses the favorite editor from the display screen with the screen in that condition.

Furthermore, the content of the editor list which is shown in FIG. 1 is one example, and the invention is not limited to this. It is also acceptable to provide a greater number and varieties of personified editors.

Moreover, the processing program which performs the processing of the invention which is explained above can be recorded on a recording medium such as a floppy disk, laser disk, or hard disk, and the invention includes such recording media. Moreover, it is acceptable to obtain the processing program from a network.

What is claimed is:

1. An information search processing method, comprising the steps of
presetting multiple types of searching strategies which show ways of information searching;
displaying the multiple types of searching strategies on a display in order to allow a user to select an arbitrary searching strategy among the multiple types of searching strategies;
searching information in response to a searching request that is input by the user;
preparing multiple personified processing managers to enable the user to select an arbitrary searching strategy among the multiple types of searching strategies;
displaying the multiple personified processing managers being displayed by multiple icons, respectively, each of the multiple types of searching strategies being set corresponding to an individual icon of the multiple icons; and
selecting the corresponding searching strategy by selecting one of the multiple icons.

2. The information search processing method of claim 1, at least one processing manager among the multiple personified processing managers being a personified processing manager that learns an individual user's taste in information processing based on the user's past operating conditions, and performs searching based on the learned result when the at least one processing manager is selected by a user.

3. An information search processing method, comprising the steps presetting multiple types of editing strategies that show ways of editing searched information;
displaying the multiple types of editing strategies on a display so that a user can select an arbitrary editing strategy among the multiple types of editing strategies;
performing editing of searched information with respect to a search result of a search request which is input by the user, in accordance with an editing strategy which is selected by the user;
preparing multiple personified processing managers to enable the user to select an arbitrary editing strategy among the multiple types of editing strategies;
displaying the multiple personified processing managers by multiple icons, respectively, the multiple types of editing strategies each being set corresponding to an individual icon of the multiple icons; and
selecting a corresponding editing strategy by selecting one of the multiple icons.

4. The information search method of claim 3, at least one processing manager among the multiple personified processing managers being a personified processing manager that learns an individual user's taste in information processing based on the user's past operating conditions, and performs editing processing based on the learned result when the at least one processing manager is selected by the user.

5. The information search processing method of claim 3, in addition to said editing strategy, further including the step of presetting information for every icon indicating the type of layout the display is to be performed in when displaying the editing result which is edited in accordance with the editing strategy.

6. An information search and processing method, comprising the steps of
presetting multiple types of searching strategies that show ways of searching, and multiple types of editing strategies that show ways of editing searched information;
displaying the multiple types of searching strategies and editing strategies on a display so that a user can select an arbitrary searching strategy and editing strategy among the multiple types of searching strategies and editing strategies;
searching information and editing the searched information in accordance with the searching strategy and editing strategy selected by the user in response to the searching request input by the user;
selecting an arbitrary searching strategy and editing strategy among the multiple types of searching strategies and the multiple types of editing strategies that show ways of editing searched information;
preparing multiple personified processing managers;
displaying the processing managers as multiple icons, the multiple types of searching strategies and the multiple types of editing strategies being set corresponding to respective individual icons of the multiple icons; and
selecting a corresponding searching strategy and editing strategy by selecting one of the multiple icons.

7. The information search processing method of claim 6, at least one processing manager among the multiple personified processing managers being a personified processing manager that learns an individual user's taste in information processing based on the past operating conditions of the user, and searching and editing processing are performed based on the learned result when the at least one processing manager is selected by the user.

8. The information search processing method of claim 6, in addition to said searching strategy and said editing strategy, further including the step of presetting information for each icon indicating the type of layout the display is to be performed in when displaying the editing result which is edited in accordance with the editing strategy.

9. An information search processing device, comprising:
   a memory that stores multiple types of searching strategies that show ways of information searching;
   a user input controller that accepts a searching request of a user, reads out the multiple types of searching strategies from the memory, and displays the multiple types of searching strategies on a display to enable the user to select an arbitrary searching strategy among the multiple types of searching strategies;
   a searching device that performs information searching with respect to a searching request which was input by the user in accordance with the searching strategy which is selected by the user;
   processing managers being prepared to enable the user to select an arbitrary searching strategy among the multiple types of searching strategies;
   the multiple personified processing managers being displayed by multiple icons, respectively, the multiple types of searching strategies each being set corresponding to an individual icon of the multiple icons; and
   the corresponding searching strategy being selected by selecting one of the multiple icons.

10. The information search processing device of claim 9, at least one processing manager among the multiple personified processing managers being a personified processing manager that learns an individual user's taste in information processing based on the user's past operating conditions, and performs editing processing based on the learned result when the at least one processing manager is selected by the user.

11. An information search processing device, comprising:
   a memory that stores multiple types of editing strategies that show ways of editing with respect to searched information;
   a user input controller that accepts a searching request of a user, reads out the multiple types of editing strategies that are stored in the memory, and displays the multiple types of editing strategies on a display so that the user can select an arbitrary editing strategy among the multiple types of editing strategies;
   an editing device that performs editing of searched information in accordance with the editing strategy which is selected by the user;
   processing managers being prepared to enable the user to select an arbitrary editing strategy among the multiple types of editing strategies;
   the multiple personified processing managers being displayed by multiple icons, respectively, each of the multiple types of editing strategies being set corresponding to an individual icon of the multiple icons; and
   a corresponding editing strategy being selected by selecting one of these icons.

12. The information search processing device of claim 11, at least one processing manager among the multiple personified processing managers is a personified processing manager that learns an individual user's taste in information processing based on the user's past operating conditions relating to searching, and performs editing processing based on the learned result when the at least one processing manager is selected by the user.

13. The information search processing device of claim 11, in addition to said editing strategy, information is also preset for every icon indicating the type of layout the display is to be performed in when performing the display of the editing result which is edited in accordance with the editing strategy.

14. An information search processing device, comprising:
   a memory that stores multiple types of searching strategies that show ways of searching, and multiple types of editing strategies that show ways of editing searched information;
   a user input controller that accepts a searching request of a user, reads out the multiple types of searching strategies and editing strategies that are stored in the memory, and displays the multiple types of searching strategies and editing strategies on a display so that the user can select an arbitrary searching strategy and editing strategy among the multiple types of searching strategies and editing strategies;
   a searching device that searches information with respect to a searching request of the user in accordance with the searching strategy and editing strategy that are selected by the user; and
   an editing device that performs editing with respect to the result that is searched by the searching means, in accordance with the searching strategy and the editing strategy that are selected by said user, to enable the user to select an arbitrary searching and editing strategy among the multiple types of searching strategies and the multiple types of editing strategies, multiple personified processing managers are prepared, the multiple personified processing managers being displayed as multiple icons, respectively, the multiple types of searching strategies and editing strategies being set corresponding to individual icons of the multiple types of icons and a corresponding searching strategy and editing strategy being selected by selecting one of the multiple icons.

15. The information search processing device of claim 14, at least one processing manager among the multiple personified processing managers being a personified processing manager that learns an individual user's taste in information processing based on the past operating conditions of the user, and searching and editing processing are performed based on the learned result when the at least one processing manager is selected by the user.

16. The information search processing device of claim 14, in addition to said searching strategy and said editing strategy, information is preset for each icon indicating the type of layout the display is to be performed in when performing a display of the editing result which is edited in accordance with the editing strategy.

17. A recording medium on which is recorded an information search processing program, the processing program comprising the steps of:
   storing multiple types of searching strategies that show ways of searching in a memory;

displaying the multiple types of searching strategies on a display so that a user can select an arbitrary searching strategy among the multiple types of searching strategies that are stored in the memory;

searching information with respect to a searching request of the user in accordance with the searching strategy that is selected by the user;

preparing multiple personified processing managers to enable the user to select an arbitrary searching strategy among the multiple types of searching strategies;

displaying the multiple personified processing managers by multiple icons, respectively, each of the multiple types of searching strategies being set corresponding to an individual icon of the multiple icons; and selecting the corresponding searching strategy by selecting on of the multiple icons.

18. The recording medium on which is recorded an information search processing program as recited in claim 17, at least one processing manager among the multiple personified processing managers being a personified processing manager that learns an individual user's taste in information processing based on the user's past operating conditions, and performs searching based on the learned result when the at least one processing manager is selected by a user.

19. A recording medium on which is recorded an information search processing program, the processing program comprising the steps of:

storing multiple types of editing strategies that show ways of editing searched information in a memory;

displaying the multiple types of editing strategies on a display to enable a user to select an arbitrary editing strategy among the multiple types of editing strategies that are stored in the memory;

editing the searched information in accordance with the editing strategy which is selected by the user;

preparing multiple personified processing managers to enable the user to select an arbitrary editing strategy among the multiple types of editing strategies;

displaying the multiple personified processing managers by multiple icons, respectively, each of the multiple types of editing strategies being set corresponding to an individual icon of the multiple icons; and selecting a corresponding editing strategy by selecting one of the multiple icons.

20. The recording medium on which is recorded the information search processing program as recited in claim 19, at least one processing manager among the multiple processing managers being a personified processing manager that learns an individual user's taste in information processing based on the user's past operating conditions, and performs editing processing based on the learned result when the at least one processing manager is selected by the user.

21. The recording medium on which is recorded an information search processing program as recited in claim 19, in addition to said editing strategies, information is also preset for every icon indicating the type of layout the display is to be performed in when performing the display of the editing result which is edited in accordance with the editing strategy.

22. A recording medium on which is recorded an information search processing program, the processing program comprising the steps of:

storing multiple types of search strategies that show ways of searching and multiple types of editing strategies that show ways of editing searched information in a memory;

displaying multiple types of searching strategies and editing strategies on a display to enable the user to select an arbitrary searching strategy and editing strategy among the multiple types of searching strategies and editing strategies that are stored in the memory;

searching information with respect to a search request of the user in accordance with the searching strategy and editing strategy that are selected by the user; and editing the searched information in accordance with the searching strategy and editing strategy that are selected by the user;

preparing multiple personified processing managers to enable the user to select an arbitrary searching strategy and editing strategy among the multiple types of searching strategies and editing strategies, the multiple personified processing managers being displayed as multiple icons;

setting the multiple types of searching strategies and the multiple types of editing strategies corresponding to respective individual icons of the multiple icons; and selecting a corresponding searching strategy and editing strategy by selecting one of the multiple icons.

23. The recording medium in which is recorded an information search processing program as recited in claim 22, at least one processing manager among the multiple personified processing managers is a personified processing manager that learns an individual user's taste in information processing based on the past operating conditions of the user, and searching and editing processing are performed based on the learned result when the at least one processing manager is selected by the user.

24. The recording medium which is recorded an information search processing program as recited in claim 22, in addition to said searching strategy and said editing strategy, information is preset for each icon indicating the type of layout the display is to be performed in when performing a display of the editing result which is edited in accordance with the editing strategy.

25. A system comprising:

memory means which stores a plurality of various search strategies showing ways of searching information;

user input control means which receives a user search request and reads a plurality of various search strategies from the memory means, and provides the search strategies so that a user can select an arbitrary search strategy from among the plurality of various search strategies;

information search means which performs an information starch in response to a search request which has been input by the user in accordance with the search strategy selected by the user;

personified processing manager preparing means which enable the user to select an arbitrary searching strategy among the multiple types of searching strategies;

displaying means which displays the multiple personified processing managers by multiple icons, respectively, the multiple types of searching strategies each being set corresponding to an individual icon of the multiple icons; and selecting means which allows the user to select the corresponding searching strategy by selecting one of the multiple icons.

* * * * *